3,280,051
VARNISHES PREPARED FROM CONDENSATES OF ALKYL PHENOLS WITH CHLOROMETHYLATED DIPHENYL OXIDES

Howard P. Cordts, Bay City, Mich., and Alexander M. Partansky, Concord, Calif., assignors to The Dow Chemical Company, Midland, Mich., a corporation of Delaware
No Drawing. Filed May 29, 1961, Ser. No. 113,097
5 Claims. (Cl. 260—18)

The present invention relates to varnishes of superior chemical resistance and more particularly concerns varnishes prepared from long-chain unsaturated fatty acid esters fortified with alkylphenol-chloromethylated diphenyl oxide condensates which are useful as coatings. The new class of resin varnishes shows shortened drying times and improved chemical resistance.

It has now been found that the reaction of a long-chain unsaturated fatty acid ester, i.e., a drying oil, with an alkylphenol-chloromethylated diphenyl oxide condensate (a preponderance of the diphenyl oxide groups therein having at least two chloromethyl groups thereon) at a temperature of between about 200° and 500° F. for from 1 to about 3 hours produces a varnish resin which imparts improved chemical resistance and shortened drying time to varnish compositions.

The condensates suitable for reaction in accordance with the present invention are the condensation products of an alkylphenol having from 1 to 10 or more carbon atoms in the alkyl portion and chloromethylated diphenyl oxide. The condensation reaction conveniently proceeds when the reactants are mixed in substantially equal molecular proportions and at a temperature of from about room temperature to about 150° C. The exact procedure for their preparation is completely described in copending application Serial No. 831,002, filed August 3, 1959 by Lawrence Sonnabend, now U.S. Patent 3,128,259, and Serial No. 113,096, filed May 29, 1961, even date herewith by James Doedens et al. entitled "Polymer" now U.S. Patent 3,219,628.

The alkylphenols having from 1 to 10 or more carbon atoms in the alkyl portion which are employed in accordance with the present invention are, for example, the substituted phenols wherein the alkyl substituent is methyl-; ethyl-; propyl-; isopropyl-; butyl-; sec. butyl-; t. butyl-; isobutyl-; amyl-; isoamyl; sec. amyl; t. amyl-; and hexyl-; octyl-; nonyl-; decyl-; and the like, in all of their isomeric forms.

The drying oils suitable for use in accordance with the present invention are the long-chain unsaturated fatty acid esters, as for example, tung oil, linseed oil, soya oil, oiticica oil, fish oil, sesame oil, and the like.

The following examples are illustrative of the present invention but are not limiting.

EXAMPLE 1

150 grams of t. butylphenol-chloromethylated diphenyl oxide condensate prepared in the manner of copending application Serial No. 831,002, filed August 3, 1959 was heated with 315 grams of tung oil at 400° F. for about 2 hours at which time a three-foot string could be pulled from a pill of the reaction mixture on a cold (room temperature) glass plate. The reaction mixture was then cooled to 300° F. and thinned with 662 cc. of xylol. The thinned mixture was cooled to room temperature, and to ½ of the thinned mixture driers were added on a weight basis, 0.4 percent lead, 0.05 percent cobalt and 0.02 percent manganese as their naphthenates in oil. The resulting varnish was applied to steel panels by immersion technique and, after evaporation of the solvent, the panels were baked in an oven at 150° C. for one hour. The baked panels were cooled to room temperature and immersed in acetone for five minutes. The panels coated with the varnish made in accordance with the present invention softened only slightly whereas control panels coated in a like manner with a high grade conventional spar varnish based on para-phenylphenol-formaldehyde-resin and baked in a like manner softened badly when immersed in acetone for five minutes. Other baked samples of each type varnish were immersed in aqueous 2 percent sodium hydroxide. The tung oil-para-phenylphenol-formaldehyde-resin based spar varnish blistered whereas the varnish made in accordance with the present invention held up with no blistering.

EXAMPLE 2

A. *Preparation of various alkylphenol-chloromethylated diphenyl oxides*

I. TERTIARY-AMYLPHENOL-CHLOROMETHYLATED DIPHENYL OXIDE RESIN

Chloromethylated diphenyl oxide (24.2 percent chlorine), 527 grams, and 492.7 grams of p-tert-amylphenol were mixed together in a flask and heated to between 90° and 92° C. for 45 minutes. The reaction mixture was stirred constantly. Thereafter the temperature raised over a two and one-half hour period to 150° C. and was maintained thereat for 5 hours. The reaction mixture was then distilled under a pressure of 4 mm. Hg and at a temperature of 200° C. The residue was a straw-colored clear resin which had a softening point (ring and ball method) of 83° C.

II. ORTHO-SEC.-BUTYLPHENOL-CHLOROMETHYLATED DIPHENYL OXIDE RESIN

Ortho-sec.-butylphenol 90 grams, was charged to a flask and 1054.8 grams of chloromethylated diphenyl oxide (24.2 percent chlorine) was added dropwise, with stirring, over a one-half hour period while maintaining the reaction mixture at about 90° C. The remainder of the procedure was the same as employed in the preparation of the t.amylphenolchloromethylated diphenyl oxide resin above.

III. PARA-OCTYLPHENOL-CHLOROMETHYLATED DIPHENYL OXIDE RESIN

Para-octylphenol, 399 grams was charged to a flask and 412 grams of chloromethylated diphenyl oxide (24.6 percent chlorine) was added in a dropwise manner, with stirring, over a 40-minute period at about 90° C. Thereafter the procedure was the same as in the preparation of t.amyl phenol-chloromethylated diphenyl oxide resin above.

B. The resins prepared above were cooked with tung oil in the manner of Example 1 and thinned with xylol and driers were added to produce resin varnishes of substantially the same character as that obtained in Example 1.

We claim:
1. An improved varnish comprising the reaction product of a drying oil with an alkylphenol-chloromethylated diphenyl oxide condensation product having from 1 to 10 carbon atoms in the alkyl moiety of the alkylphenol and said chloromethylated diphenyl oxide having no reactive groups other than chloromethyl groups.
2. The varnish of claim 1 wherein said drying oil is tung oil.
3. The varnish of claim 1 wherein said phenol is butylphenol.
4. The varnish of claim 1 wherein said phenol is octylphenol.
5. A varnish comprising as the varnish base the varnish of claim 1, a varnish solvent and metallic driers.

(References on following page)

References Cited by the Examiner

UNITED STATES PATENTS

| | | | |
|---|---|---|---|
| 2,060,715 | 11/1936 | Arvin | 260—61 |
| 2,750,298 | 6/1956 | Kiebler et al. | 260—18 |
| 3,128,259 | 4/1964 | Sonnabend | 260—18 |
| 3,137,677 | 6/1964 | Bolgiano | 260—61 |

FOREIGN PATENTS 691,622   4/1940   Germany.

LEON J. BERCOVITZ, *Primary Examiner.*

DONALD E. CZAJA, MILTON STERMAN, *Examiners.*

C. W. IVY, R. W. GRIFFIN, H. W. HAEUSSLER,
*Assistant Examiners.*